US012225005B2

(12) United States Patent
Yoskowitz et al.

(10) Patent No.: US 12,225,005 B2
(45) Date of Patent: *Feb. 11, 2025

(54) APPARATUS AND METHOD FOR AUTOMATED EMAIL AND PASSWORD CREATION AND CURATION ACROSS MULTIPLE WEBSITES

(71) Applicant: JOINESTY, INC., Chicago, IL (US)

(72) Inventors: Robert Jeffrey Yoskowitz, Chicago, IL (US); Stephen Michael Yoskowitz, Chicago, IL (US); Andreas Imthurn, St. Gallen (CH); Elder Donizetti Dos Santos, Sao Jose dos Campos (BR)

(73) Assignee: JOINESTY, INC., Deerfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/206,191

(22) Filed: Jun. 6, 2023

(65) Prior Publication Data
US 2023/0319027 A1 Oct. 5, 2023

Related U.S. Application Data

(63) Continuation of application No. 17/716,681, filed on Apr. 8, 2022, now Pat. No. 11,711,356, which is a
(Continued)

(51) Int. Cl.
H04L 9/40 (2022.01)
G06F 21/10 (2013.01)
G06F 21/31 (2013.01)

(52) U.S. Cl.
CPC .......... *H04L 63/083* (2013.01); *G06F 21/10* (2013.01); *G06F 21/31* (2013.01); *G06F 2221/2115* (2013.01)

(58) Field of Classification Search
CPC ... H04L 63/083; H04L 63/0869; G06F 21/31; G06F 21/10; G06F 21/30; G06F 2221/2115

See application file for complete search history.

(56) References Cited

U.S. PATENT DOCUMENTS 7,310,772 B2    12/2007  Whitfield
7,433,710 B2    10/2008  Bodnar et al.
(Continued)

FOREIGN PATENT DOCUMENTS

WO    WO-2013163652 A2    10/2013
WO    WO-2015000397 A1    1/2015

OTHER PUBLICATIONS

International Search Report and Written Opinion for Application No. PCT/US2017/026224, dated Jul. 10, 2017.
(Continued)

*Primary Examiner* — Hosuk Song
(74) *Attorney, Agent, or Firm* — MARSHALL, GERSTEIN & BORUN LLP

(57) ABSTRACT

One or more first servers can implement an example method including storing, at a memory accessible by the first one or more servers, a primary email address for a user. The method further includes detecting a request, from a client device associated with the user, to access a network resource hosted at a second one or more servers, wherein the network resource is associated with an online service. The method also includes automatically generating a secondary email address for the user that is unique to the online service; and transmitting the secondary email address to the second one or more servers such that the online service receives the secondary email address for the user without receiving the primary email address for the user, thereby enabling the
(Continued)

online service to transmit emails to the user despite not receiving the primary email address for the user.

20 Claims, 5 Drawing Sheets

Related U.S. Application Data continuation of application No. 16/549,787, filed on Aug. 23, 2019, now Pat. No. 11,336,638, which is a continuation of application No. 15/480,314, filed on Apr. 5, 2017, now abandoned.

(60) Provisional application No. 62/318,674, filed on Apr. 5, 2016.

(56) References Cited

U.S. PATENT DOCUMENTS

| | | | |
|---|---|---|---|
| 8,014,757 | B1 | 9/2011 | Lim |
| 8,090,787 | B2 | 1/2012 | Polis et al. |
| 8,516,550 | B2 | 8/2013 | Willars et al. |
| 8,700,788 | B2 | 4/2014 | Gailey et al. |
| 8,738,475 | B2 | 5/2014 | Keld |
| 9,703,988 | B1 | 7/2017 | Sudbury et al. |
| 9,781,083 | B2 * | 10/2017 | Munshi ............... H04L 63/0428 |
| 10,057,251 | B2 | 8/2018 | Strand et al. |
| 10,069,970 | B1 | 9/2018 | Drake et al. |
| 10,148,659 | B2 | 12/2018 | Nandakumar |
| 10,158,640 | B2 | 12/2018 | Himmelstein |
| 10,200,346 | B2 | 2/2019 | Munshi et al. |
| 10,657,061 | B1 | 5/2020 | Marriner |
| 10,721,195 | B2 | 7/2020 | Jakobsson |
| 10,742,641 | B2 | 8/2020 | Vidal |
| 10,986,054 | B1 | 4/2021 | Yoskowitz et al. |
| 11,240,261 | B2 * | 2/2022 | Lowry ............... H04L 63/1483 |
| 11,336,638 | B2 * | 5/2022 | Yoskowitz ............ H04L 63/083 |
| 11,711,356 | B2 * | 7/2023 | Yoskowitz .............. G06F 21/31 726/6 |
| 11,765,116 | B2 * | 9/2023 | Sampath ............... H04L 51/212 709/206 |
| 11,824,870 | B2 * | 11/2023 | Jeyakumar ............ H04L 51/212 |
| 2002/0136370 | A1 | 9/2002 | Gallant |
| 2002/0138743 | A1 | 9/2002 | Murakami et al. |
| 2003/0028599 | A1 | 2/2003 | Kolsky |
| 2005/0198173 | A1 | 9/2005 | Evans |
| 2008/0005341 | A1 | 1/2008 | Subbian |
| 2008/0008105 | A1 | 1/2008 | Black et al. |
| 2008/0045186 | A1 | 2/2008 | Black et al. |
| 2008/0052364 | A1 | 2/2008 | Zhou |
| 2008/0148366 | A1 | 6/2008 | Wahl |
| 2009/0193507 | A1 | 7/2009 | Ibrahim |
| 2010/0017598 | A1 | 1/2010 | Rodriguez et al. |
| 2011/0295988 | A1 | 12/2011 | Le Jouan |
| 2012/0016938 | A1 | 1/2012 | Gallant |
| 2012/0109882 | A1 | 5/2012 | Bouse et al. |
| 2014/0164254 | A1 | 6/2014 | Dimmick |
| 2014/0317708 | A1 | 10/2014 | Adrangi et al. |
| 2014/0344907 | A1 | 11/2014 | Wan et al. |
| 2014/0373106 | A1 | 12/2014 | Morgenroth |
| 2015/0288676 | A1 | 10/2015 | Guo |
| 2015/0341327 | A1 | 11/2015 | Barton et al. |
| 2016/0119261 | A1 | 4/2016 | Ghafourifar et al. |
| 2016/0142536 | A1 | 5/2016 | Bendi et al. |
| 2016/0255040 | A1 | 9/2016 | Howe |
| 2016/0283920 | A1 | 9/2016 | Fisher et al. |
| 2016/0300231 | A1 | 10/2016 | Shavell et al. |
| 2017/0024581 | A1 | 1/2017 | Grubel et al. |
| 2017/0237739 | A1 | 8/2017 | Nandakumar |
| 2019/0037071 | A1 | 1/2019 | Singh et al. |
| 2019/0312837 | A1 | 10/2019 | McIsaac et al. |
| 2019/0387025 | A1 | 12/2019 | Gummaraju et al. |
| 2020/0090182 | A1 | 3/2020 | Dimmick |
| 2020/0404009 | A1 | 12/2020 | Shinomiya et al. |
| 2021/0021572 | A1 | 1/2021 | Bonczar |
| 2021/0051015 | A1 | 2/2021 | Widmann et al. |

OTHER PUBLICATIONS

Lin et al "Security in Enterprise Networking: A Quick Tour," IEEE Communication Magazine, Jan. 1996, pp. 56-61 (Year: 1996).

Ndibanje et al "Security Analysis and Improvements of Authentication and Access Control in the Internet of Things," Aug. 13, 2014, pp. 14786-14805 (Year: 2014).

Abdulghani et al "A Study on Security and Privacy Guidelines, Countermeasures, Threats: IoT Data at Rest Perspective," Symmetry, MDPI, pp. 1-36, Jun. 10, 2019 (Year: 2019).

Raghavendra et al "Survey on Data Storage and Retrieval Techniques over Encrypted Cloud Data," International Journal of Computer Science and Information Security (IJCSIS), vol. 14, No. 9, Sep. 2016, pp. 718-745 (Year: 2016).

\* cited by examiner create profile

First name: Matthew — 300
Last name: Jones — 302
Email Address: matthew.jones@gmail.com — 304
Password: Password123 — 306
Confirm Password: Password123 — 308
Mailing Address: 555 South West Street #1 — 310

APPARATUS AND METHOD FOR AUTOMATED EMAIL AND PASSWORD CREATION AND CURATION ACROSS MULTIPLE WEBSITES

CROSS-REFERENCE TO RELATED APPLICATION

This application is a continuation of U.S. application Ser. No. 17/716,681, which was filed on Apr. 8, 2022 and titled "Apparatus and Method for Automated Email and Password Creation and Curation Across Multiple Websites," which is a continuation of U.S. application Ser. No. 16/549,787, which was filed on Aug. 23, 2019 and titled "Apparatus and Method for Automated Email and Password Creation and Curation Across Multiple Websites," and which is a continuation of U.S. application Ser. No. 15/480,314, which was filed on Apr. 5, 2017 and titled "Apparatus and Method for Automated Email and Password Creation and Curation Across Multiple Websites," which claims priority to U.S. Provisional Patent Application Ser. No. 62/318,674, which was filed on Apr. 5, 2016 and titled "Email Portal with Automated Email and Password Creation and Curation Across Multiple Websites," the contents of which are incorporated herein by reference.

FIELD OF THE INVENTION

This invention relates generally to communications in computer networks. More particularly, this invention is directed toward automated email and password creation and curation across multiple websites.

BACKGROUND OF THE INVENTION

People are required to supply an email address to receive many, if not most, of the online services they rely upon. Such services frequently also require an additional credential, such as a password. People are vexed by keeping track of different passwords for different websites or run a security risk if they use a single password across multiple websites.

Therefore, it would be desirable to relieve the problems associated with supplying a personal email address to every resource that requires it, while requiring as little user behavioral modification as possible. Further, it would be desirable to automatically create secure passwords without burdening a user with the responsibility of tracking such passwords.

SUMMARY OF THE INVENTION

A machine has a network interface circuit for connection with a network. A processor is connected to the network interface circuit. A memory is connected to the processor. The memory stores instructions executed by the processor to maintain primary contact information for a user, content delivery preferences for the user, and resource access credentials for the user, where the resource access credentials include an automatically generated user name and password to automatically access a resource connected to the network. Transaction details from the resource connected to the network are received. The content delivery preferences are applied to the transaction details to form a transaction record for the user. The transaction record is supplied to the user utilizing the primary contact information.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
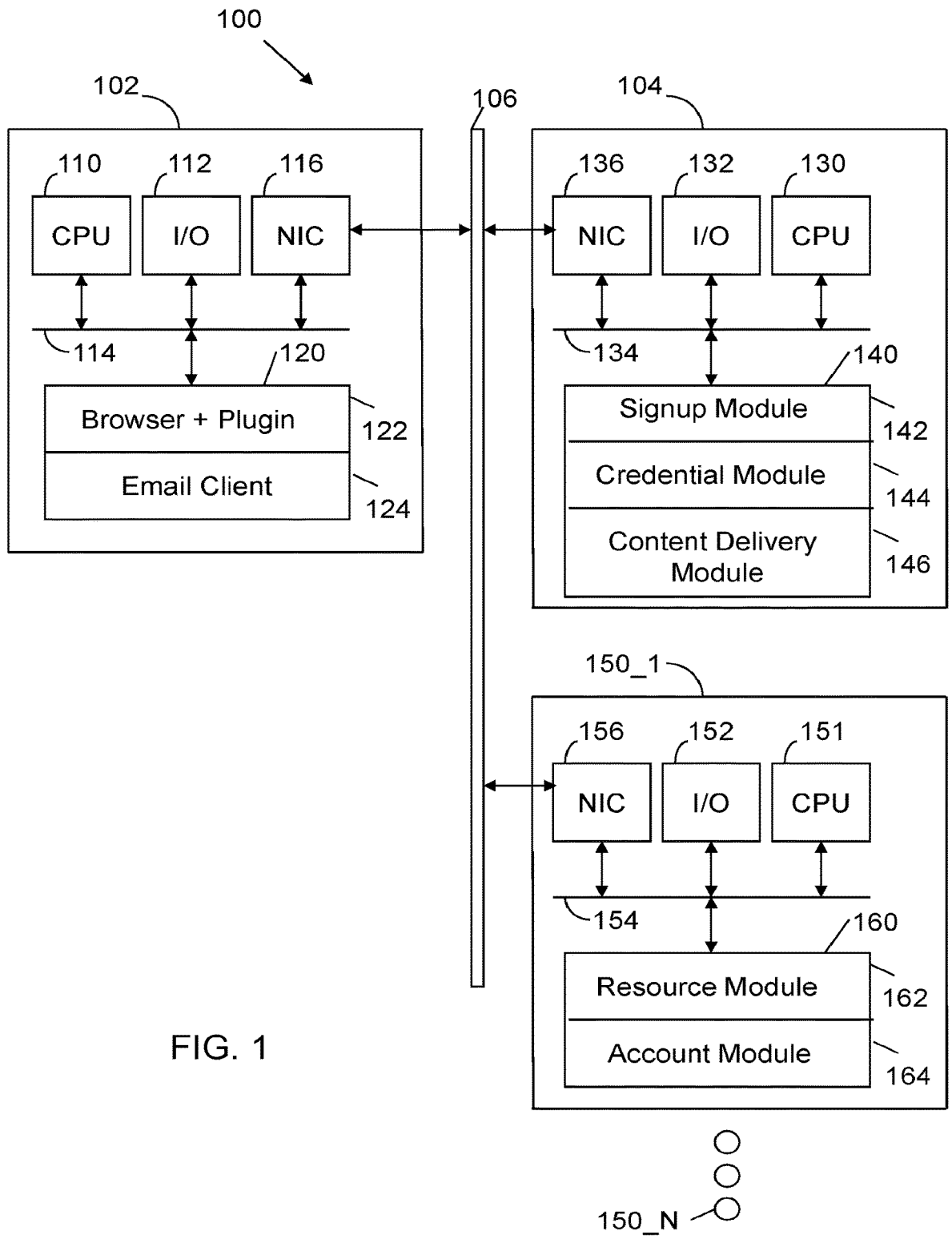
FIG. 1 illustrates a system configured in accordance with an embodiment of the invention.

FIG. 1 illustrates a system 100 configured in accordance with an embodiment of the invention. The system 100 includes a client machine connected to a server 104 via a network 106, which may be any combination of wired and wireless networks. The client machine 102 includes standard components, such as a central processing unit 110 and input/output devices 112 connected via a bus 114. The input/output devices 112 may include a keyboard, mouse, touch display and the like. A network interface circuit 116 is also connected to the bus 114 to supply connectivity to network 106. A memory 120 is also connected to the bus 114. The memory stores instructions executed by the processor 110. In one embodiment, the memory 120 stores a browser and a plugin 122 to implement operations disclosed herein. The browser provides standard functionality to access web sites. The plugin is used to communicate with server 104 and to coordinate the automatic credentialing of a user at a website, as discussed in detail below. The browser and plugin 122 may be substituted with an application that implements the operations discussed below. The memory 120 also stores an email client 124. The email client 124 coordinates the sending and receipt of email communications in accordance with embodiments of the invention. The client 102 may be a desktop computer, a laptop computer, a tablet, a smartphone, a wearable device and the like.

The server 104 also includes standard components, such as a central processing unit 130, input/output devices 132, bus 134 and network interface circuit 136. A memory 140 is connected to the bus 134. The memory stores instructions executed by the central processing unit 130 to implement operations disclosed herein. In one embodiment, the memory 140 stores a signup module 142 which coordinates a registration process for a user operating client device 102. The memory 140 also stores a credential module 144. The credential module 144 stores instructions executed by the processor 130 to provision credentials for different web sites accessed by a user operating client device 102. In one embodiment, the provisioned credentials include an automatically generated email address, which may operate as a user name, and a password. The credential module 144 maintains credentials for different websites without user involvement. Consequently, a user may rely solely upon primary contact information, without distributing the primary contact information across multiple websites. The memory 140 also stores a content delivery module 142. The content delivery module 142 stores instructions executed by the processor 130 to administer content delivery preferences for a user of client device 102. As discussed below, server 104 communicates with multiple websites and collects information from such websites that is communicated to a user in accordance with content delivery preferences.

FIG. 1 also illustrates a set of servers 150_1 through 150 N connected to network 106. Each server hosts a web site or network resource. Each server includes standard components, such as a central processing unit 151, input/output devices 152, a bus 154 and a network interface circuit 156. A memory 160 is connected to bus 154. The memory 160 stores a resource module 162. The resource module 162 includes instructions executed by processor 151 to implement a services supplied by the resource, such as an ecommerce service, a news delivery service, a social network service and the like. The memory 160 also stores an account module 164. The account module 164 stores instructions executed by processor 151 to administer access to and control of a user account. As discussed below, the credential module 144 communicates with the account module 164 to automatically supply account credentials for a user of client device 102.

Figure 2:
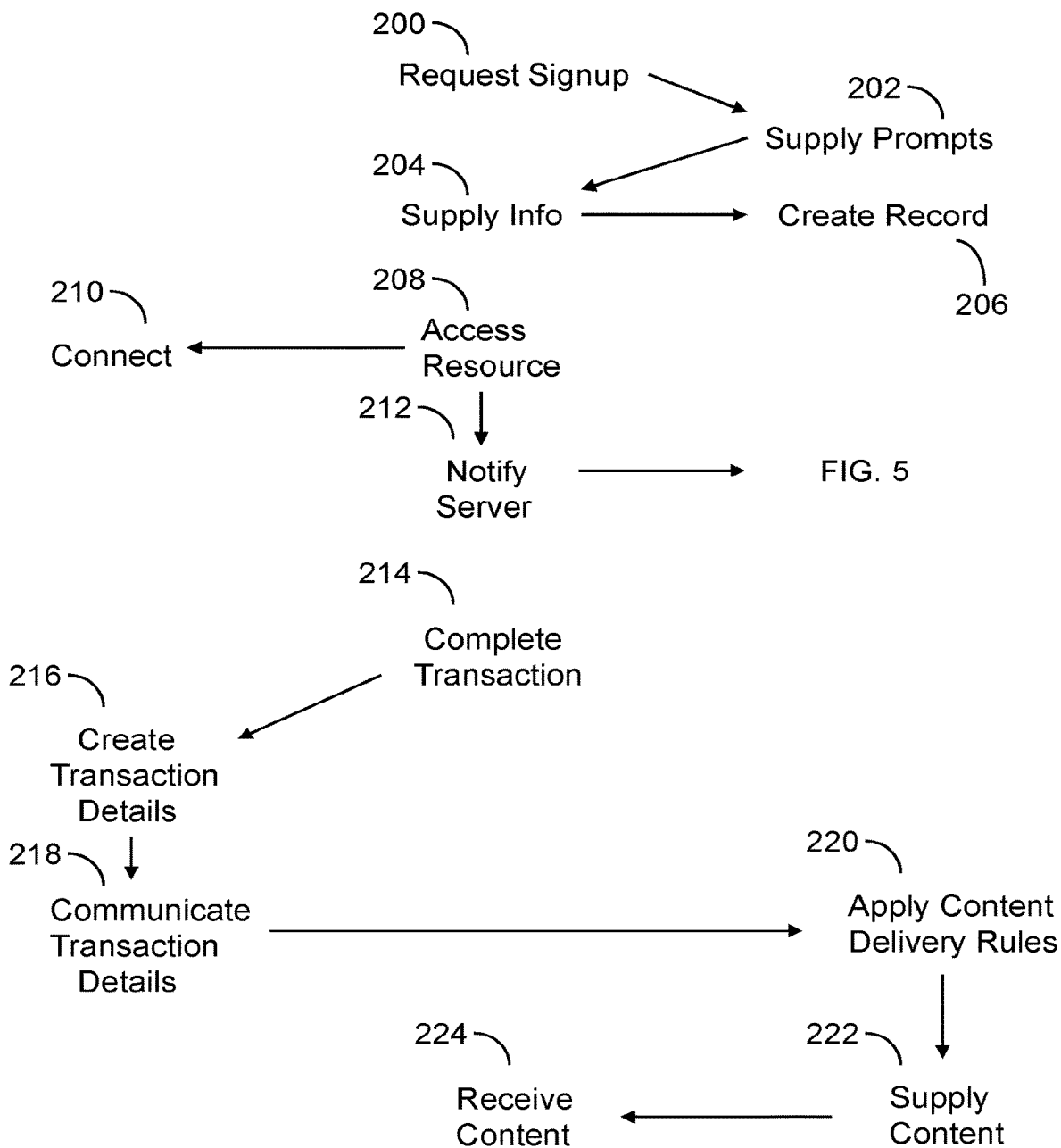
FIG. 2 illustrates interactions between components of FIG. 1.
Figures 3, 4:
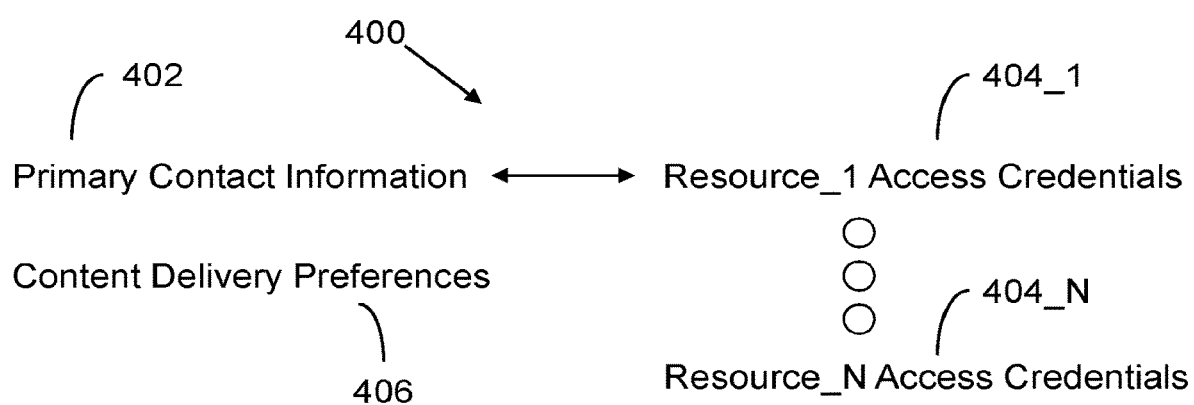
FIG. 3 illustrates the creation of a primary identity profile in accordance with an embodiment of the invention.
FIG. 4 illustrates a record with primary contact information, a set of resource access credentials and content delivery preferences in accordance with an embodiment of the invention.

FIG. 2 illustrates interactions between a resource machine 150_1, client machine 102 and server 104. Initially, a user of client machine 102 requests to signup 200 for the service disclosed herein. For example, the user may use browser 122 to access the signup module 142 of server 104. The signup module 142 supplies prompts 202 to client machine. FIG. 3 is an example of such prompts. FIG. 3 prompts a user for primary contact information. In this example, the primary contact information includes a first name 300, a last name 302 and a primary contact email address 304. The prompts may also include a password 306, a password confirmation 308 and a mailing address 310. Additional prompts may be used for additional contact information, credit card information, and the like.

Returning to FIG. 2, a user supplies information 204 in response to the prompts. For example, a user may manually enter information in response to the prompts. Alternately, some or all of the profile information may be form filled based upon information that the server 104 already possesses about the user or is able to obtain about the user. This results in the creation of a record 206.

FIG. 4 illustrates a record 400 maintained in accordance with an embodiment of the invention. The record 400 includes primary contact information 402, such as the type collected from the prompts of FIG. 3. The record 400 also includes resource access credentials 404 1 through 404 N. Each resource access credential includes an email or user name and a password for access to an online resource. Thus, the primary contact information 402 is associated with multiple resource access credentials 404 1 through 404 N for the different online resources accessed by a user. The record may also include content delivery preferences 406. The content delivery module 146 collects information over network 106 about different interactions a user of client device 102 has with different resources 150_1 through 150 N. This information may be in the form of transaction details. The content delivery preferences are applied to the transaction details to form a transaction for a user. The transaction record is supplied to the user utilizing the primary contact information for the user. The content delivery preferences 406 may specify a digest of communications for a specified time period, such as all email collected during a single day period. Alternately, the content delivery preferences may specify communication forwarding on a communication by communication basis.

Returning to FIG. 2, after the signup process, the activity by user of client machine 102 is tracked. For example, a browser plugin may be downloaded to the client machine 102 during the signup process. The browser plugin may track accesses to resources (e.g., websites) and report such accesses to the credential module 144 of server 104. Thus, FIG. 2 illustrates an operation in which a user at client machine 102 accesses a resource 208. This results in a connection 210 with the resource. The access of the resource results in a notification to the server 212. The notification may be initiated by the browser plugin. Alternately, the user activity may be tracked with a separate application executed on the client machine 102.

Figure 5:
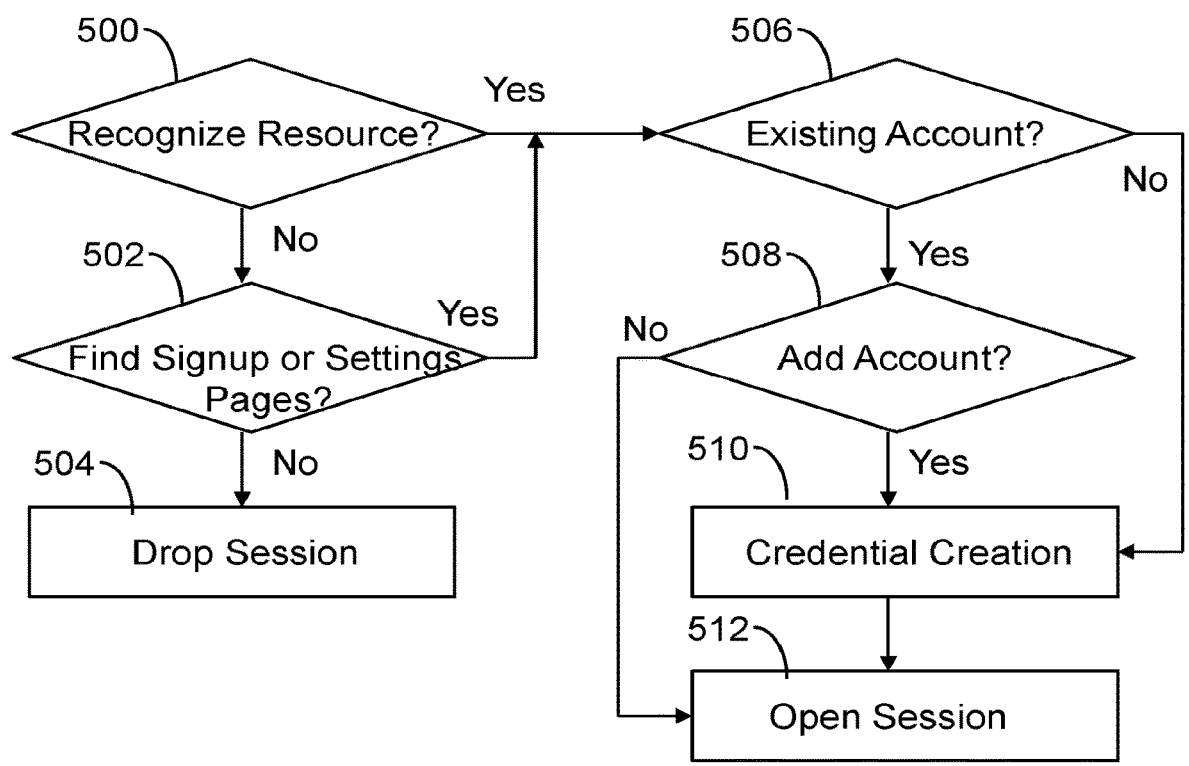
FIG. 5 illustrates processing associated with the automatic creation of resource credentials in accordance with an embodiment of the invention.

When a user accesses a resource, the server 104 performs the operations of FIG. 5. The operations of FIG. 5 may be implemented in the credential module 144. Initially, it is determined whether the resource is recognized 500. The credential module 144 may maintain a list of resources (e.g., web sites). For each resource, the credential module 144 may also maintain information on the set of credential required to access the resource (e.g., an email address or user name and a password), such as shown in record 400 of FIG. 4. Alternately, some or all of this information may be maintained in the browser and plugin or application utilized by the client machine 102.

If the resource is not recognized (500—No), the credential module 144 accesses the resource over network 106 to look for a signup page or a settings page. Machine learning and/or classifier techniques may be used to search for these pages. If such a page cannot be found (502—No), then the session is dropped 504 by the server 104 and the client device 102 may proceed without utilizing the services disclosed herein. On the other hand, if the signup or settings page is found (502—Yes) control proceeds to block 506. Similarly, if the resource is initially recognized (500—Yes), control proceeds to block 506. The credential module 144 determines whether an account exists 506. If an account does not exist (506—No), credentials are created 510. That is, the credential module 144 utilizes primary contact information, such as a first name, last name and mailing address from record 400 to create a profile at the resource. In addition, the credential module 144 automatically generates a user name (e.g., an email address) and a password for the resource.

Figure 6:
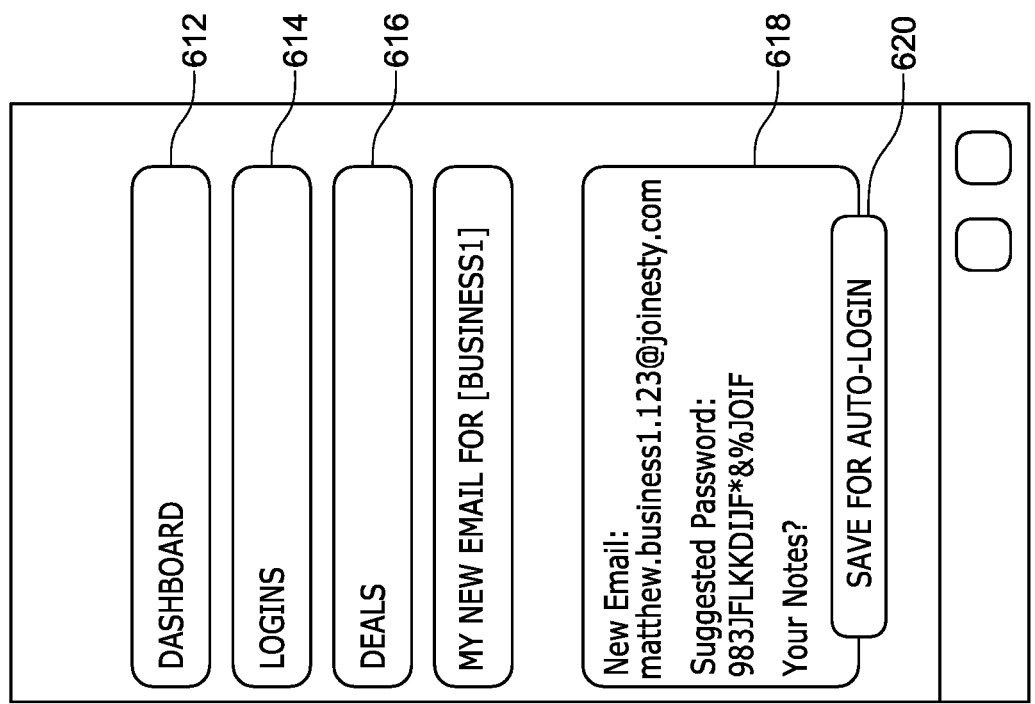
FIG. 6 illustrates the automatic provisioning of credentials for a resource in accordance with an embodiment of the invention.

FIG. 6 illustrates the results of these operations. The figure illustrates a profile page for the resource. The credential module 144 uses primary contact information to populate the first name field 600, last name field 602 and mailing address field 610. In addition, the credential module 144 automatically populates the email address field 604 and the password fields 606 and 608. The email address field 604 may include a base address (e.g., joinest.com), such that future communications are directed toward server 104, which will in turn process such communications for selective delivery to the client machine 102 in accordance with the content delivery preferences for the user contained in the content delivery module 146. Observe here that the credential module 144 generates a distinctive password without assistance from the user and without the need for the user to store it or otherwise have knowledge of it.

FIG. 6 also illustrates additional information hosted by the credential module 144. The additional information may include a dashboard 612. Selection of the dashboard 612 may result in the display of different resources and a listing of communications associated with each resource. Thus, each resource may be thought of as having a corresponding container, where the container stores communications to and from the resource.

FIG. 6 also illustrates a field for login information 614. Selection of this field may result in a listing of individual resources and login information associated with each resource. The login information may display record 400 of FIG. 4.

FIG. 6 also includes a field for "deals" 616. Selection of the deals field 616 may result in the supply of promotional activity (e.g., coupons, passes and the like) initiated by a resource. Observe here that the promotional activity is not pushed to the user's primary contact information and therefore the user reduces communication clutter. On the other hand, the user can still access such information at a time that is convenient to the user by accessing server 104.

FIG. 6 also illustrates a field 618 with credential information for a resource. Field 620 allows a user to authorize the utilization of this credential information for automatic login to a resource.

Returning to FIG. 5, after credential creation 510, a session is opened 512 using the credentials. That is, the user is logged into the resource using the credentials. Server 104 may coordinate communications between client device 102 and resource 150 from this point forward.

Returning to block 506, if there is already an existing account (506—Yes), the user is prompted to determine whether he or she wants to add another account at the resource 508. If so (508—Yes), credentials are created 510. If not (508—No), the session is opened 512.

Returning to FIG. 2, after a session is initiated, a transaction may be completed 214 by a user at the client machine 102. The resource 150_1 creates transaction details 216. For example, the transaction details may relate to a purchase, a request for downloaded content, a request for notification of future promotions and the like. The resource then communicates the transaction details 218 to the server 104. Observe here that the client machine 102 is bypassed. The server 104 applies content delivery rules 220. For example, the content delivery module 146 may apply the content delivery rules. The content is then supplied 222 from the server 104 to the client machine 102. The client machine 102 receives the content 224.

Thus, the disclosed technology allows one to create a unique email and secure password for each and every service a user either has an account with, or signs up for in the future. By pairing this with algorithmic classifiers and giving users a manual "override" in event of classifier failure, one can not only create these emails for the user at relevant points in a user's digital life, but also "inject" them onto web pages. These "trigger" points are when a user comes into contact with signup pages and account settings pages, so that a user can stop giving out personal email when signing up for services moving forward, and can also update their information on file for accounts that they already have. Every service and each user gets a unique email inbox and password (e.g., John Smith signing up for Widgets.com would receive the email address "john.widgets.12@joinesty.com", and for "New Business" would receive "john.newbusiness.24@joinesty.com" each with their own randomized secure passwords). Once the user selects to "save" these credentials for any business (e.g., using button 620 of FIG. 6), the credentials are added to record 400 as a resource access credential (e.g., 404_1 through 404_N).

The email addresses are fully functioning, and can both receive and send messages, allowing the businesses and users to have uninterrupted communication. Incoming emails go to the user's dashboard (e.g., as invoked by button 612 of FIG. 6), and can be wrapped into a daily digest to be emailed to the user once per day. Users have the option to turn email forwarding on and off for each specific business, as well as forward individual messages. Further, credentials are stored as they are created, whether the user has chosen to utilize them or not, so that there is no risk of users creating accounts without an account retrieval ability.

FIG. 5 discussed an automated process for recognizing a resource. A resource may also be added through acts performed by a user. For example, the email and password creation can be triggered by the user opening a browser sidebar and clicking "my new email for [businessname]". This causes the credential module 144 to create a new email and password for that user, for that business, and immediately display it to them, such as shown in FIG. 6. Other "auto" triggers include when the user visits a signup page and/or an account settings page for a business. In such a case, the credential module 144 creates an email and password for the user, which may then be displayed, such as shown in FIG. 6.

Overall, the system secures users' online identity while improving their organization.

For users this results in enhanced security. Every service that has a user's email represents a security risk. Even the most sophisticated of users cannot know or remain aware of each and every service's data practices. This may result in security breaches and identity theft regardless of the mechanisms the user puts in place internally. Because businesses store at least one variable (the email address or user name) of the two usually needed to log in as the user to other services in the user's life, the user's online life is only as secure as the business with the weakest data security practice. Creating a unique email for each service the user has, or wants to have, an account with removes the relevance of how that service stores their data. If any of these third party data systems are breached, the data compromised will be of no use in gaining access to any of the user's other accounts.

The disclosed technology also provides accurate login credential storage. By storing the newly created email and password at point of signup, the user does not need to remember the emails or passwords. This allows the system to create as many email addresses as the user needs to remain secure across their digital signup life, without creating a security risk arising from users having to figure out unsecure ways to organize all these accounts.

The disclosed technology also facilitates email hygiene. As the services users sign up for now have an email address hosted by the server 104, outbound emails from these services go to the server 104, rather than directly to the user's inbox. This means that the user has enhanced control and feature sets available to them regarding the treatment of these communications. The user can use the content delivery module 146 to specify the auto-forwarding of communications from these services into their email client 124, wrap all communications into a single "daily digest", or even block emails from a business from being passed on to their email client 124. These inbound emails will still be displayed to the user if the user accesses server 104.

Since the credential module 144 creates emails based on the business that the user is viewing and using, each business will have exclusive inboxes. This means that as emails come into the content delivery module 146, the content delivery module 146 can automatically associate the sender addresses (e.g. no-reply@business.com) with their respective business. The content delivery module 146 may include an "inbox cleanup" feature. When a user opts-in to this feature, the content delivery module 146 establishes a secure link with their email client 124 and using this list of senders, first matches senders in their inbox with a list of recognized businesses, and creates folders in their inbox for each business. The content delivery module 146 may establish sender-based-filters in their inbox to move all emails from all businesses from the user's inbox into their respective folders. As new emails come in, the content delivery module 146 routes them directly into the originating business's folder. Users can control these email behaviors using parameters associated with the content delivery module 146.

The email client 124 may be used to respond to a communication from a resource. The response may be an email that is received by the content delivery module 146. The content delivery module 146 forwards the user communication to the resource using the automatically generated user name. Advantageously, this masks the primary contact information for the user.

In one embodiment, the content delivery module 146 facilitates user specific deals. That is, businesses segment their promotional code offerings, but the user must comb through their inbox in order to find their deals, compounding the issue of inbox clutter. Because the content delivery module 146 automatically delineates which user is receiving which emails from which businesses, there is an ability to pull and display user specific deals to the correct user on her or his dashboard, as well as on the page of the service offering them.

The disclosed system is also advantageous for businesses. First, it decreases the cost associated with any potential data breach. Next, it removes friction points in both the signup and the login process for their users. In addition, it provides an alternative to a pure "unsubscribe" function, giving the business the ability to continue communications with users who would otherwise choose to unsubscribe. It decreases the risk of lost information between the business and the customer, as communications and files can remain accessible in one repository.

The system may also include a file management feature. As services email their customers through the server 104, the server 104 can store all files these services are sending for easy retrieval by the user anytime. This increases user organization and security by making sure files are associated with the right business and are automatically stored securely, while decreasing burden on the services by ensuring users have access to required documentation and information needed to complete the various tasks that service will require of them in the future.

The system may also incorporate expense tracking. As emails with receipts come into the server 104, expense tracking can be triggered to show the user how much they are spending across their digital services, and recommend services to help them save money.

The system also facilitates automated login swapping. That is, the system can offer with the click of one button to swap the user's existing credentials with a business for the newly created login credentials. If the user selects this, the system would log in as the user to their accounts, and replace not only the password on file with the randomized secure password for that account, but also exchange their email on file with that business with the email created for them for that business.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed:

1. A method comprising:
   storing, at a memory accessible by a one or more servers, a primary email address for a user;
   detecting, by the one or more servers, a request, from a client device, for a secondary email address for the user;
   automatically generating, by the one or more servers, the secondary email address in response to the request, the secondary email address associated with the primary email address such that emails to the secondary email address are forwarded to the primary email address;
   transmitting, by the one or more servers, the secondary email address to the client device;
   receiving, by the one or more servers, a message from the secondary email address to a recipient address; and
   forwarding, by the one or more servers, the message to the recipient address such that the message appears to originate from the secondary email address.

2. The method of claim 1, further comprising:
   receiving, by the one or more servers, an email directed to the secondary email address; and
   forwarding, by the one or more servers, the email to the primary email address.

3. The method of claim 1, wherein detecting the request comprises:
   detecting, by the one or more servers, that the client device is accessing a signup page for the online service.

4. The method of claim 1, wherein detecting the request comprises:

detecting, by the one or more servers, a user interaction with a user interface element for generating new secondary emails.

5. The method of claim 4, wherein automatically generating the secondary email address comprises:
automatically generating, by the one or more servers, the secondary email address in response to detecting the user interaction.

6. The method of claim 1, further comprising:
transmitting, by the one or more servers, the secondary email address to the client device.

7. The method of claim 6, wherein transmitting the secondary email address to the client device causes the client device to display the secondary email address.

8. The method of claim 7, further comprising:
detecting, by the one or more servers, a subsequent request to access a given online service;
analyzing, by the one or more servers, the record to determine if the record includes a previously generated secondary email address associated with the given online service;
when the record includes a previously generated secondary email address associated with the given online service:
   transmitting, by the one or more servers, the previously generated secondary email address to one or more servers associated with the given online service such that the given online service receives the previously generated secondary email address; and
when the record does not include a previously generated email address associated with the given online service:
   (i) automatically generating, by the one or more servers, a new secondary email address for the user that is unique to the given online service, and
   (ii) transmitting, by the one or more servers, the new secondary email address to the one or more servers associated with the given online service such that the given online service receives the new secondary email address.

9. The method of claim 1, further comprising:
receiving, at the one or more servers, data representing a preference regarding email forwarding from the secondary email address to the primary email address;
receiving, by the one or more servers, an email directed to the secondary email address;
when the preference indicates emails should be forwarded from the secondary email address to the primary address:
   forwarding, by the one or more servers, the email to the primary email address; and
when the preference indicates emails should not be forwarded from the secondary email address to the primary address:
   refraining from forwarding, by the one or more servers, the email to the primary email address.

10. The method of claim 1, further comprising:
automatically generating, by the one or more servers, a password for accessing the online service; and
transmitting, by the one or more servers, the password to the one or more servers associated with the online service to enable the user to access the online service.

11. A system comprising:
a memory storing a primary email address for the user; and
one or more processors coupled to the memory and configured to execute computer code to:
   detect a request, from a client device, for a secondary email address for the user;
   automatically generate the secondary email address in response to the request, the secondary email address associated with the primary email address such that emails to the secondary email address are forwarded to the primary email address;
   transmit the secondary email address to the client device;
   receive a message from the secondary email address to a recipient address; and
   forward the message to the recipient address such that the message appears to originate from the secondary email address.

12. The system of claim 11, wherein the computer code, when executed, cause the one or more processors to:
receive an email directed to the secondary email address; and
forward the email to the primary email address.

13. The system of claim 11, wherein to detect the request, the computer code, when executed, cause the one or more processors to:
detect that the client device is accessing a signup page for the online service.

14. The system of claim 11, wherein to detect the request, the computer code, when executed, cause the one or more processors to:
detect a user interaction with a user interface element for generating new secondary emails.

15. The system of claim 14, wherein to automatically generate the secondary email address, the computer code, when executed, cause the one or more processors to:
automatically generating, by the one or more servers, the secondary email address in response to detecting the user interaction.

16. The system of claim 11, wherein the computer code, when executed, cause the one or more processors to:
transmit the secondary email address to the client device.

17. The system of claim 16, wherein transmitting the secondary email address to the client device causes the client device to display the secondary email address.

18. The system of claim 17, wherein the computer code, when executed, cause the one or more processors to:
detect a subsequent request to access a given online service;
analyze the record to determine if the record includes a previously generated secondary email address associated with the given online service;
when the record includes a previously generated secondary email address associated with the given online service:
   transmit the previously generated secondary email address to one or more servers associated with the given online service such that the given online service receives the previously generated secondary email address; and
when the record does not include a previously generated email address associated with the given online service:
   (i) automatically generate a new secondary email address for the user that is unique to the given online service, and
   (ii) transmit the new secondary email address to the one or more servers associated with the given online service such that the given online service receives the new secondary email address.

19. The system of claim 11, wherein the computer code, when executed, cause the one or more processors to:

receive data representing a preference regarding email forwarding from the secondary email address to the primary email address;

receive an email directed to the secondary email address;

when the preference indicates emails should be forwarded from the secondary email address to the primary address:

forward the email to the primary email address; and when the preference indicates emails should not be forwarded from the secondary email address to the primary address:

refrain from forwarding the email to the primary email address.

20. The system of claim 11, wherein the computer code, when executed, cause the one or more processors to:

automatically generate a password for accessing the online service; and transmit the password to the one or more servers associated with the online service to enable the user to access the online service.

* * * * *